United States Patent
Prabhu et al.

(10) Patent No.: US 11,676,209 B1
(45) Date of Patent: Jun. 13, 2023

(54) SYSTEMS AND METHODS TO AUTHENTICATE IDENTITY AND STOCK OWNERSHIP

(71) Applicant: Broadridge Investor Communication Solutions, Inc., Edgewood, NY (US)

(72) Inventors: Jnyaneshwar Prabhu, Livermore, CA (US); Gary Lutin, New York, NY (US)

(73) Assignee: Broadridge Investor Communication Solutions, Inc., Edgewood, NY (US)

(*) Notice: Subject to any disclaimer, the term of this patent is extended or adjusted under 35 U.S.C. 154(b) by 0 days.

(21) Appl. No.: 16/596,158

(22) Filed: Oct. 8, 2019

Related U.S. Application Data

(63) Continuation of application No. 15/427,869, filed on Feb. 8, 2017, now abandoned, which is a continuation of application No. 14/151,604, filed on Jan. 9, 2014, now abandoned, which is a continuation of application No. 13/415,437, filed on Mar. 8, 2012, now abandoned.

(51) Int. Cl.
| | | |
|---|---|---|
| *G06Q 40/00* | (2023.01) | |
| *G06Q 40/06* | (2012.01) | |
| *H04L 9/40* | (2022.01) | |

(52) U.S. Cl.
CPC .............. *G06Q 40/06* (2013.01); *H04L 63/08* (2013.01)

(58) Field of Classification Search
CPC ...................................... G06Q 40/06
USPC .......................................... 705/37
See application file for complete search history.

(56) References Cited

U.S. PATENT DOCUMENTS

| | | | | |
|---|---|---|---|---|
| 2006/0047725 A1* | 3/2006 | Bramson | ............... | H04L 67/306 |
| 2007/0239484 A1* | 10/2007 | Arond | .................... | G16H 40/20 |
| | | | | 705/2 |
| 2009/0299812 A1* | 12/2009 | Ray | ....................... | G06Q 30/02 |
| | | | | 705/35 |
| 2010/0241493 A1* | 9/2010 | Onischuk | ............ | G06F 21/6245 |
| | | | | 705/12 |

(Continued)

OTHER PUBLICATIONS

An Electronic Voting Scheme Based on FOO Protocol (Year: 2020).*

(Continued)

*Primary Examiner* — Bruce I Ebersman
(74) *Attorney, Agent, or Firm* — Greenberg Traurig, LLP

(57) ABSTRACT

A system and method for verifying over a computer network the legitimacy of a participant in communications by authenticating the participant's actual name and address, and in some embodiments also authenticating the participant's ownership of corporate stock. At least one processor is provided that is configured to verify participant identity by authenticating the participant's actual name and address through any one of several offered alternative means, including from subscription, membership or credit card information, or confirmation of USPS mail delivery. A processor may also be configured to verify stock ownership through whatever records suit the participant, including SEC records, corporate transfer agent records, electronic copies of ownership records or online custodial account records. The independent processes of identity and ownership verification may be coordinated to verify investor status in communications. If an independent moderator conducts verification, the participant may determine what verified information is reported to enable anonymous communication.

15 Claims, 14 Drawing Sheets

(56) References Cited

U.S. PATENT DOCUMENTS

| | | | |
|---|---|---|---|
| 2011/0145150 A1* | 6/2011 | Onischuk | G06Q 30/08 |
| | | | 705/50 |
| 2014/0013110 A1* | 1/2014 | Thoniel | H04L 9/321 |
| | | | 713/156 |
| 2014/0058945 A1* | 2/2014 | Stecher | G06Q 20/383 |
| | | | 705/44 |

OTHER PUBLICATIONS

Authenticating displayed names in telephony, IEEE (Year: 2009).*
Access granted: The imperative of innovation and standardization in information security, IEEE (Year: 2009).*

* cited by examiner

THE SHAREHOLDER FORUM

310 → Existing Registered Participants

If you are a registered participant in the shareholder forum, please sign in:

312 →
314 → Email address: [____]
Password: [____]

[SIGN IN]

If you have previously established your ownership of ABC Corp. shares and your position has not changed, check this box. ☐

New Registration → 320

To establish a free registered participant account with the shareholder forum, please enter your email address and select a password here.*
322 →
314 → Email address: [____]
Proposed password: [____]

[REGISTER]

*Note: Any information you provide will be used by the shareholder forum only to independently verify your stated identity and stock ownership, according to the forum's established privacy policies supporting anonymous communication. The shareholder Forum will report only what you specifically authorize, so that you will have complete control of what information is disclosed to others. You will be able to create a user name and have any email forwarded through a privacy-protected account, so that you can choose to be identified only as a legitimate investor with confirmed holdings of whatever number of your actually owned shares you decide to report.

FIG. 3

THE SHAREHOLDER FORUM

The Shareholder Forum provides free registration of investors who want to engage in information exchanges, establishing the legitimacy of a Registered Participant whether the person chooses to communicate with either an anonymous user name or a disclosed identity. You will be given complete control of what information is reported, according to Forum privacy policies developed from a decade of supporting investor access to information and exchanges of views.*

To register, we offer several choices for confirming your actual name and address. Please select the process you prefer, and also provide the email address associated with the selected process if different from the one you are using now. Then click the "Next" button.

I am a current subscriber of the following financial information publisher:

410 → ☐ ABC Analytics
☐ Global Data  } 415
☐ XYZ Securities Research

I am a current member of the following professional organization:

420 → ☐ Metropolis Society of Stock Analysts } 425
☐ Institute of Stock Researchers I will contribute at least one dollar ($1) to the following educational organization, using a credit card owned in the name and address I want to verify:

430 → ☐ Prestigious University School of Business, Securities Analysis Program
☐ Oldest University Business Journal  } 435
☐ Great Capitalist Foundation If you cannot use one of these processes to verify the additional name and address, click this "Alternatives" button for other processes.

[ ALTERNATIVES ]

* We will not keep any information other than the records you authorize us to maintain. To support your Registered Participant privileges, this information will normally include the email address you provide, the name and address we confirm as yours, a password you select for logging in, and the records of what you ask us verify for your stock ownership positions. All of this information will be considered private, and the forum will not report any of it unless you specifically tell us to do so. In your communications with others as a registered participant, you will be able to identify yourself with a user name that preserves your anonymity, and you may also prevent disclosure of identifying information by having us report a number of owned shares of a company that is less than the specific number actually verified.

FIG. 4

THE SHAREHOLDER FORUM

Your RP account

Registered Participant Account of [name of verified investor]

You have now been established as a Registered Participant, and can use this verified identity for any communications supported by the Shareholder Forum, whether with an anonymous user name or your real name. You can also confirm additional names and addresses for account records or funds you represent, now or at any time in the future, to be included in your profile for purposes of verifying your ownership interests.*

To confirm additional names and addresses of funds now, click the "Addresses" button.

[ADDRESSES] ← 610

You can also establish that you represent an institution that files SEC Form 13F reports, which will allow you to refer to those records for simple, automatic verifications of any of that institution's reported stock ownership positions. This requires first establishing the address your institution reports to the SEC as its business or mailing address as one of those verified for your Registered Participant identity. To proceed with this one-time process, click this "SEC Filer" button.

[SEC FILER] ← 620

To proceed immediately with the verification of stock ownership for records using the name and address already confirmed, click the "Proceed" button.

[PROCEED] ← 630

*Verifying your Shareholder Position with either SEC filings or a corporate transfer agent registry of direct stock ownership will require use of the name and address as shown in those records. Your current verified identity as a Registered Participant is sufficient, though, for the alternative processes of stock ownership verification through an online brokerage account or an uploaded copy of your account records.

FIG. 6

THE SHAREHOLDER FORUM

Registered Participant Account of [name of verified investor]    Your RP account

Registering additional names and addresses:

If you want to register an additional name and address for your investments, you can verify the name and address with any one of the same processes that are used for primary identity verification. As an existing Registered Participant, you can also use a process for mailing a code to your address and confirming its receipt, shown at the end of the listed choices below.

I want to verify the name and address I use as a current subscriber of the following financial information publisher:
- ☐ ABC Analytics
- ☐ Global Data
- ☐ XYZ Securities Research I want to verify the name and address I use as a current member of the following professional organization:
- ☐ Metropolis Society of Stock Analysts
- ☐ Institute of Stock Researchers I will contribute at least one dollar ($1) to the following educational organization, using a credit card owned in the name and address I want to verify:
- ☐ Prestigious University School of Business, Securities Analysis Program
- ☐ Oldest University Business Journal
- ☐ Great Capitalist Foundation I want you to send me by U.S. Postal Service a unique control code so that I can show that I receive mail at the following address, and state that this is my true name and address so that you will grant provisional verification pending my confirmation of receiving the code:

Name: ☐    Street address: ☐
City: ☐    State: ☐
Zip/postal code: ☐    Country: ☐

Associated email address, if different: ☐

[ALTERNATIVES]

If you cannot use one of these processes to verify the additional name and address, click this "Alternatives" button for other processes.

[NEXT]

THE SHAREHOLDER FORUM

Your RP account

Registered Participant Account of [name of verified investor]

Registering your representation of an institutional investor filing SEC Form 13F reports:

If you want the Shareholder Forum to be able to automatically verify the SEC filing records of stock positions for an institutional investor you represent, you can simply verify the relationship for your Registered Participant account. Once verified, your Registered Participant identity will be set up to automatically search your institution's most recent quarterly Form 13F report when you choose the SEC process for verifying your stock ownership of a company.

To start, just enter your fund's SEC-assigned "CIK" number into the box below. (To find the CIK number, go to an SEC EDGAR website page showing your institution's Form 13F filing. The CIK number will be presented immediately after the company name in the blue listing box.) Then click the "Find Addresses" button below and we will present the addresses from SEC records for your selection of one to verify.

SEC assigned CIK#: [          ]

[FIND ADDRESSES]

FIG. 8

THE SHAREHOLDER FORUM

Registered Participant Account of [name of verified investor]     Your RP account

Verifying Your ABC Corp Stock Ownership

You can use any one of the alternative processes below to verify your ABC Corp shareholder status. If you hold shares in more than one account and want to include all the shares in your verified total, you will be able to repeat the verification as many times as necessary, with a choice of process suited to each account, and when you are finished establish the total of all holdings.

Note that all of the information you provide for ownership verification will be considered private, including the specific number of shares you own, and the Shareholder Forum will report only what you specifically tell us to report. When you have completed the verification process and are ready to proceed with your communications, you will be able to choose two things for us to report for identifying you as a legitimate investor: (1) a name that you select for communication with this company, which can be either an anonymous user name or your actual name, and (2) whatever number of shares you want to present, assuming the number does not exceed what we have verified.

Please review the requirements of records for each alternative process, and select the one that suits you. Then select the address that you use for the records to be verified. (If you want us to verify an additional address for your Registered Participant identity, check the "new" box.) When you have checked your choice, press the "Proceed" button below.

☐ [Registered Participant's previously verified address #1, automatically printed here from account record]
☐ [Registered Participant's previously verified address #2, automatically printed here from account record]
☐ [etc.]
☐ New Address ☐ SEC filing records ← 910
    Requirements: If you represent an institutional investor that files SEC Form 13F reports of its stock ownership, this automated verification process requires only the addition of your institution's business or mailing address to your Registered Participant identity. (Note: Our use of public records for verification will not change the private status of your communication.)

☐ Corporate transfer agent records ← 920
    Requirements: If you own shares issued directly by the corporation, you can use this automated process by simply including the address of record - to which the company's dividends or reports are sent - in your Registered Participant identity.

☐ Uploaded copy of records ← 930
    Requirements: You will need an electronic copy of your stock ownership records, in any widely used format such as PDF, GIF, JPG, PDF, TIFF, etc., that can be uploaded to us for retention in our records.

☐ Online brokerage or custodial account records
940 →     Requirements: You will need your online brokerage account credentials to log on, so that an independent provider of online banking administrative services can access your records and report your position.*

[ PROCEED ]

* This online account access process is conducted independently by Yodlee, the leading provider of online consumer account management services for banks and securities firms. The data available through this process will be the most recent update conducted by Yodlee with your financial institution or other service provider, but Yodlee cannot assure the current accuracy of the data your service provider makes available.

FIG. 9A

THE SHAREHOLDER FORUM

Your RP account

Registered Participant Account of [name of verified investor]

<u>Uploading your ownership records</u>

Please select a file that shows your current ownership of ABC Corp stock, including your verified identity and the number of shares owned. By uploading it, you certify that it is a currently accurate statement of your ownership of this number of shares:

When you upload this file it will be archived as part of your Registered Participant account.

BROWSE

UPLOAD

FIG. 9B

THE SHAREHOLDER FORUM

Your RP account _____

Registered Participant Account of [name of verified investor]

<u>Verified ownership for communication with ABC Corp</u>

The records verify your ownership of XXX,XXX shares of ABC Corp.

To proceed with your communications, please select the name you want to use. Keep in mind that you will not be able to change the name you select, since Forum policy does not permit the use of multiple names in investor communications.

1010 {
☐ Your actual name:  John Jones
or
☐ Create a user name: [      ]
}

Also decide how many shares you want us to report as your verified ownership position. If you want to conduct your communications anonymously, you may want to choose a number that will not help to identify you. You can choose any number that does not exceed the number of shares actually verified.

1020 {
☐ Number actually owned:  XXX,XXX
or
☐ Choose a smaller number [      ]
}

[ PROCEED ]

FIG. 10

ABC Corp

HOME  ABOUT  PRODUCTS  EMPLOYMENT  INVESTORS

NEWS & EVENTS
FINANCIAL INFORMATION
STOCK INFORMATION
DIVIDENDS
CORPORATE GOVERNANCE
SHAREHOLDER SERVICES
  Investor Contacts
  Investor FAQ
  Information Request
  Submit Question
  Online Investor Kit
  Email Alerts

Submit question

Thank you for verifying your standing, and for your interest in our company.

Now, what is it that you want to ask us?

SUBMIT

SYSTEMS AND METHODS TO AUTHENTICATE IDENTITY AND STOCK OWNERSHIP

PRIORITY AND RELATED APPLICATION

N/a

FIELD OF THE INVENTION

The present invention relates to authentication or verification systems. In particular, the present invention relates to identity and stock ownership verification.

BACKGROUND OF TIE INVENTION

The use of new electronic communication technologies, and particularly the internet, is limited by the absence of acceptable methods for participants to establish the legitimacy of their identities without public disclosures of their private information. The ability to relate an identity to its user's actual name and address is an essential requirement of commercial communication, and provides comfort in social communication. The processes described in this application address this need.

There is significant economic value and public interest in the use of electronic communications not only for commerce, but also for improved access to exchanges of information relevant to all types of commercial, political, social and other decisions. Concern about the credibility of these information exchanges, however, is evident in news reports of questionable "virtual identity" information sources and of impractical efforts by social media managers to use such means as images of government-issued documents to "validate" participant claims of identity.

Online exchanges of information concerning investment decisions require particular attention, not only because of the economic importance of informed decisions about capital allocation and shareholder votes on corporate governance, but also because of special regulatory and integrity requirements that may include verifying a communication participant's ownership of the investment being addressed. These communications are important to investors and their advisers, as well as to corporate managers who are responsible for understanding and responding to investor interests. However, in spite of new SEC rules initiated explicitly to encourage the broader use of electronic information exchanges, the adoption of available communication technologies has been constrained by the inability of a corporate manager or other communication host to satisfy responsibilities for reasonably verifying the legitimacy of a participating investor's identity and ownership rights, especially when such investors wish to communicate anonymously.

The ability to verify the legitimacy of participating investors is a critical requirement for effective investor communications, electronic or otherwise. The credibility of recently developed electronic processes for information exchanges, such as analyst conference calls, corporate blog and comment posting, or online question submissions, requires the same reasonable verification of participant legitimacy that is expected of participants in traditional investor conferences and meetings. Specifically for participation in corporate annual meetings and certain other shareholder communications, companies have a legal responsibility for this reasonable verification of stock ownership rights. All parties involved with investor communication, including investors themselves as well as the corporate representatives seeking their support and the various analysts, journalists and other professionals who offer decision-making advice, recognize the need for such a verification system.

At present there are only two processes available for online verification of shareholder status, neither of which satisfactorily supports the effective use of electronic communications. One verification process uses services developed for consumer banking and personal financial management to obtain a participating investor's account records, which process can be used only by a small percentage of shareholders who hold the relevant stock in online brokerage or custodial accounts and who have no security constraints about providing access to those records. The other verification process uses control numbers sent to persons believed to be owners of a company's stock or of beneficial interests in the stock on a specified record date, based on reports of that company's transfer agent from records of directly registered shareholders and on reports of brokers and other intermediaries from their records of investor accounts holding beneficial interests in the stock owned by registered shareholders, which process is limited by its inconvenience to investors, its administrative costs, its infrequent updating, and its reliance on an inaccurate system of beneficial ownership reporting that the SEC is currently reviewing for modernization.

To satisfy these interests in the expanded use of electronic communications supporting commerce and information exchanges, and more specifically to support the interests of
  (a) any party responsible for hosting communications ("Host"),
  (b) any party participating in the hosted communications ("Participant"), and
  (c) any party serving as an independent moderator to verify a Participant's identity or stock ownership ("Moderator"),
a verification system is desired that will
  provide a set of alternative verification processes to accommodate the available information and preferences of any Participant to authenticate the actual name and mailing address used by that Participant as an actual identity, including in records of investment ownership,
  provide another set of alternative verification processes for a Participant whose actual name and mailing address has been authenticated and who wishes to engage in communications relating to investment interests to confirm any of the conventionally used forms of ownership records for the stock of a particular company that is the subject of communication,
  provide a way for either or both the identity and stock ownership verification processes to be conducted by an independent Moderator and reported to the Host of the communication process or to other observers to assure that Participant's legitimacy,
  allow the Participant to determine what information may be collected and retained by the Moderator, and what the Moderator may report to the Host, including flexibility to communicate under the Participant's actual name or anonymously with a pseudonym of the Participant's choosing,
  allow use of the verification processes in relation to any form of communication selected by a Host, ranging from online question-and-answer exchanges to either physical or electronic "virtual" attendance of meetings,
  minimize the privacy risk of information provided by the Participant, including exposure to hacking, provide the Host with controls and information needed to responsibly manage communications with verified Participants, and provide each Participant with the ability to verify multiple addresses and stock ownership records as required for communications with one or more Hosts, and in relation to one or more investment interests, over periods of time during which address and ownership facts may change, and to conveniently manage those records and communications.

BRIEF SUMMARY OF THE INVENTION

A computerized method and system is provided to satisfy all the requirements summarized above for an electronic system to verify Participant legitimacy. In this system, an independent Moderator can verify the actual name and address identity of any Participant and, if requested, that Participant's ownership of the stock of a particular company, and then report those verifications to the Host of a communication process without disclosing anything other than what the Participant has authorized to be disclosed. Verification may involve either one or both of the following, which may be conducted either independently or in sequence: (i) electronically authenticating Participant identity by actual name and address, or, (ii) for a Participant whose actual identity has been authenticated, electronically confirming that Participant's ownership of a particular company's stock. Participants are provided more than one way to verify identity and more than one way to verify stock ownership. Identity may be verified electronically through third party identity records, such as those maintained by subscription services, membership organizations and credit card companies, or by other means that assure any Participant a choice of practical means to authenticate an actual name and address. In embodiments involving investment interests, stock ownership may be verified electronically through SEC records, corporate transfer agent records, copies of ownership records or online financial services account records. For purposes of both adaptability and security, the independent Moderator may conduct the identity verification and stock ownership verification as two completely independent processes, allowing the flexible use of different data collection, storage and security methods suited to each of the component processes. Keeping only the verification records authorized by the Participant, the Moderator is then able to combine the results of both identity and stock ownership verification processes to report whatever verifications are authorized by the Participant. In all embodiments involving an independent Moderator, the Participant can determine what verified information the Moderator will disclose to the Host, and the Participant is returned to the Host's communication process which may include participation in meetings, webinars, conference calls, question submissions, blogs, message boards, surveys or any other type of communications.

BRIEF DESCRIPTION OF THE DRAWINGS

FIG. 3 is a second screen shot showing a graphical user interface of verification system embodiment of the subject invention.

FIG. 4 is a third screen shot showing a graphical user interface of verification system embodiment of the subject invention.

FIG. 6 is a fifth screen shot showing a graphical user interface of verification system embodiment of the subject invention.

FIG. 7 is a sixth screen shot showing a graphical user interface of verification system embodiment of the subject invention.

FIG. 8 is a seventh screen shot showing a graphical user interface of verification system embodiment of the subject invention.

FIG. 9A is an eighth screen shot showing a graphical user interface of verification system embodiment of the subject invention.

FIG. 9B is a ninth screen shot showing a graphical user interface of verification system embodiment of the subject invention.

FIG. 10 is an eleventh screen shot showing a graphical user interface of verification system embodiment of the subject invention.

FIG. 11 is a twelfth screen shot showing a graphical user interface of a communication page of an entity.

DETAILED DESCRIPTION OF THE INVENTION

Figure 1A:
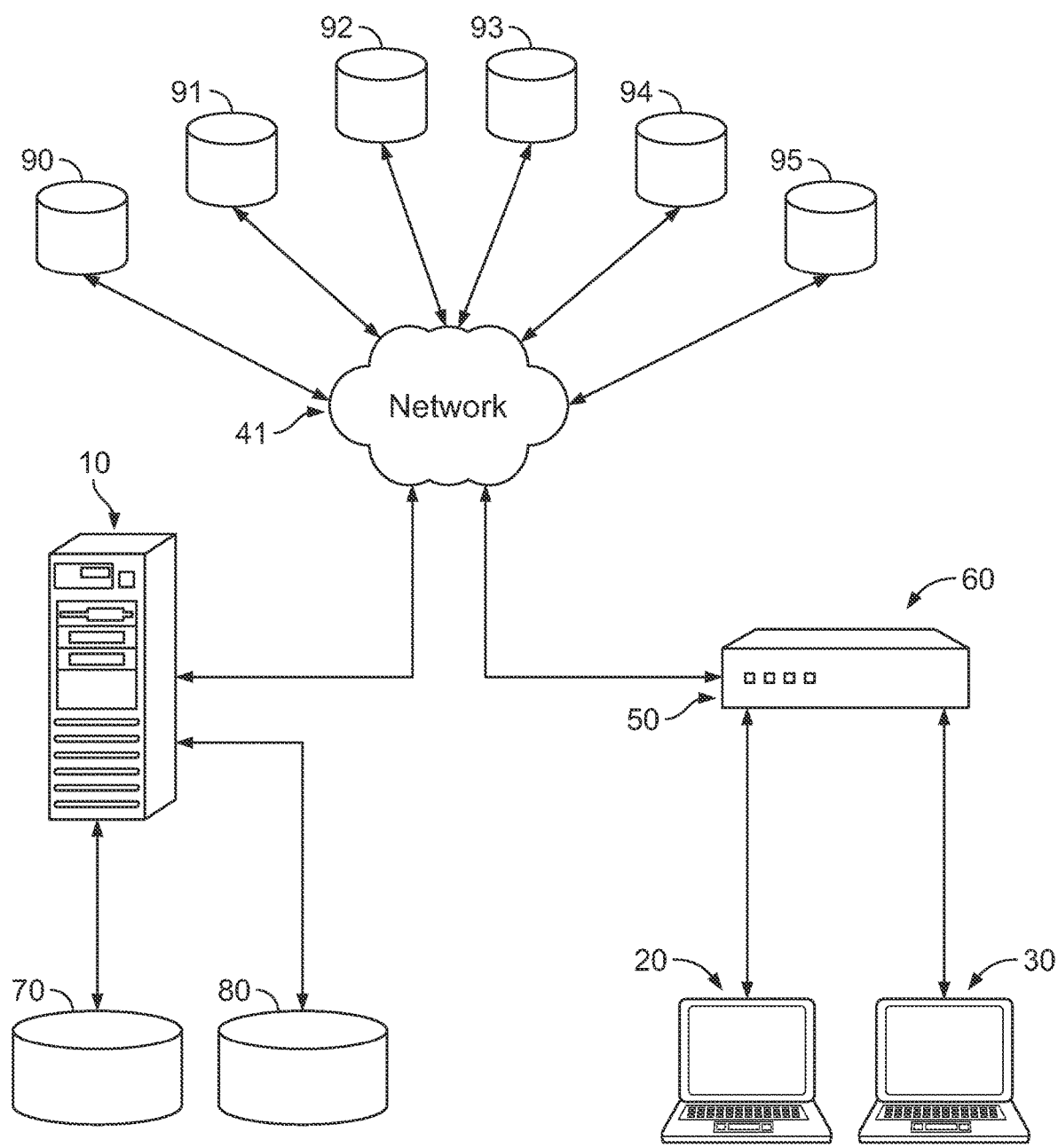
FIG. 1A is a simplified diagram of network communications.

FIG. 1A shows a simplified diagram of network communications. The application will be described with respect to an implementation illustrating both identity and stock ownership verification, involving communication between an investor Participant and a Host identified here as a company conducting investor relations communications, the fictitious "ABC Corp," but the application is not limited by such example. Computer 20 operated by an investor Participant and computer 30 operated by a Host are coupled to an Internet Service Provider ("ISP") or a Network Service Provider ("NSP") 60. The ISP provides Internet access to operators of computers 20, 30, while the NSP provides Internet access to the ISPs, as well as the operators of computers 20, 30. The ISP/NSP 60 includes a router 50 that is coupled to server 10 via a network 41 (i.e., the Internet or Intranet). A browser, which runs on each of computers 20, 30, retrieves (or downloads) Web pages from the server 10. The browser allows the operators of computers 20, 30 to navigate (or "browse") between Web pages. The server 10 is in communication with what is illustrated in this example as two separate databases, an identity database 70 and an ownership database 80, and with various sources of records required to authenticate the information to be stored in the identity and ownership databases, such as, but not limited to, databases 90-95. Please note that the terms Registered Participant™, Shareholder Forum™ and Shareholder Verification™ used in these illustrations are trademarks of The Shareholder Forum, Inc.

Figure 2:
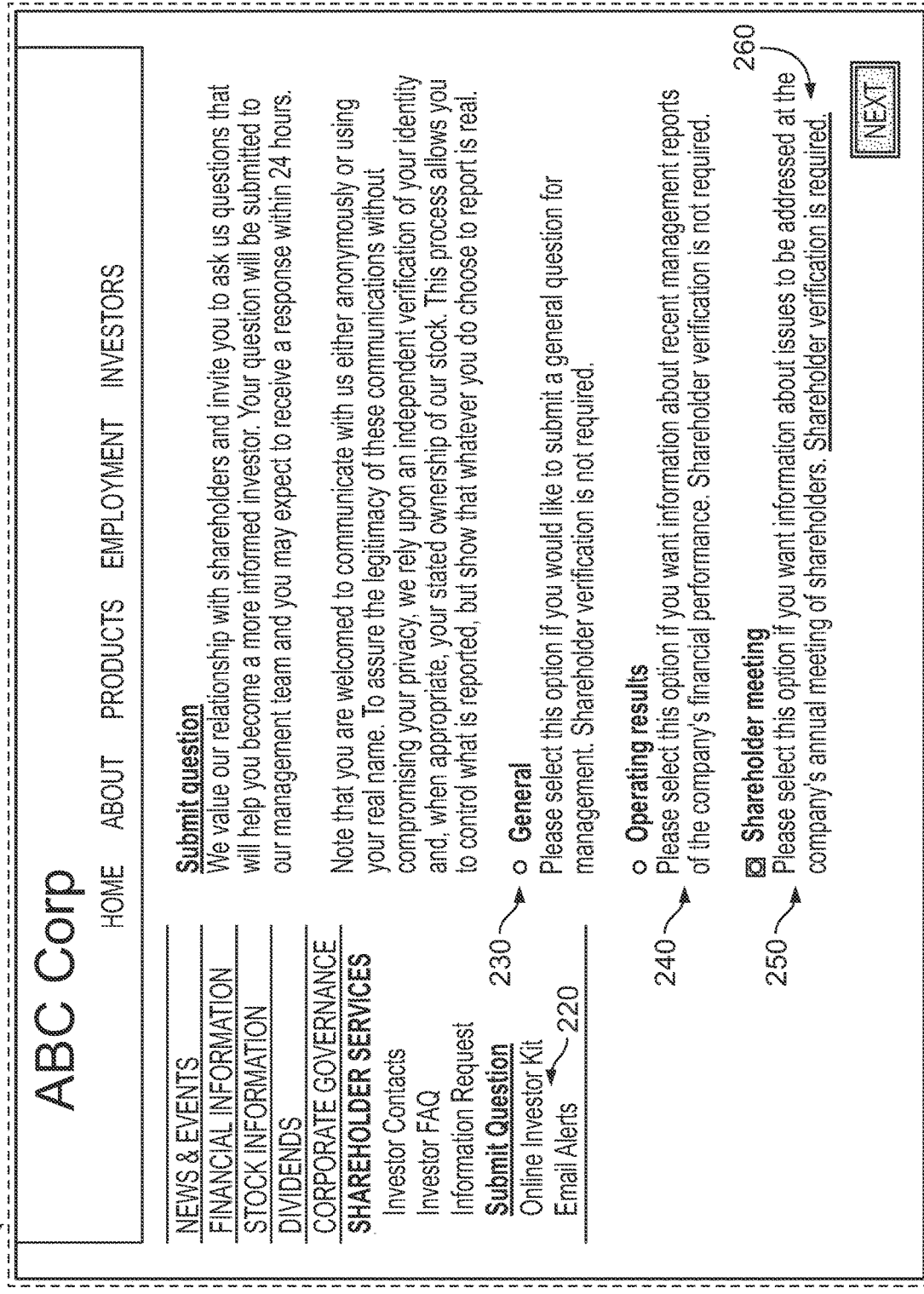
FIG. 2 is a first screen shot showing a graphical user interface of a communication page of an entity.

The server 10 is operated by a Moderator that serves to verify Participant private information. The Moderator is identified throughout the illustrations in this application as Shareholder Forum. Moderator obtains records to authenticate an investor Participant's identity and ownership information and then reports the authenticity of the Participant information once verified. Verified identity data is stored on identity database 70 and verified ownership data is stored on ownership database 80. The Host 30 will need to subscribe to the Moderator's services to verify ownership in certain instances. The Host 30 decides when the verification services of the Moderator are required for each type of communication offered. For instance. FIG. 2 shows reference number 260 that requires verification before participating in communications relating to a shareholders meeting 250.

Figure 1B:
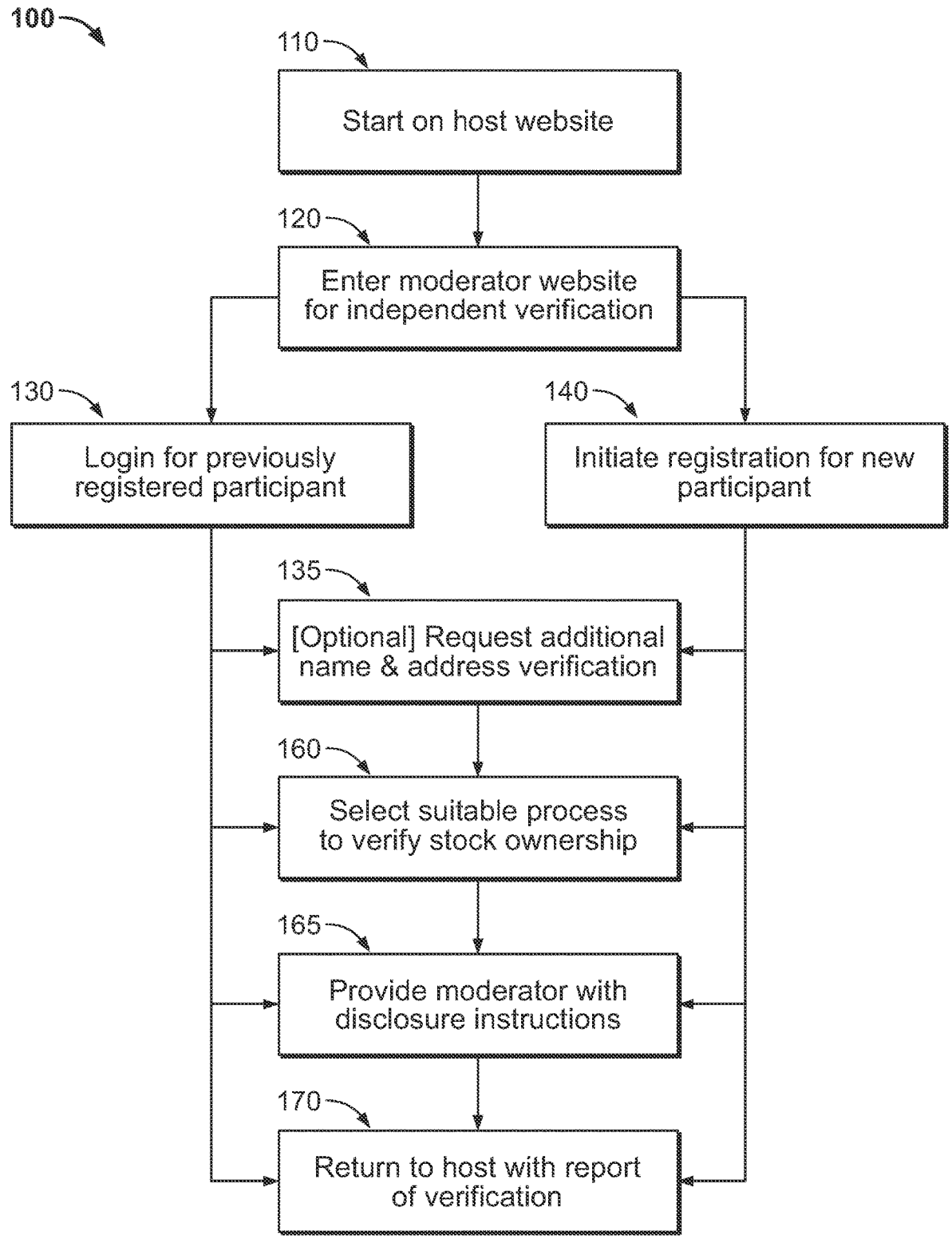
FIG. 1B is flow chart of the process of the subject invention.

FIG. 1B is a flow chart of the verification system 100 of the present invention. An investor Participant 20 initiates communication with a company issuer of stock shown as Host 30 at stage 110. In instances where the Host has chosen to require either identity verification or both identity and ownership verification of a Participant prior to communication, the Participant 20 at stage 120 will be automatically referred to the independent Moderator. If the Moderator has previously verified the identity of Participant 20 in relation to this or any other Host's communications, Participant 20 will have already obtained "Registered Participant™" status and may simply confirm that status at stage 130 to automatically refer to and rely upon the previously verified identity as well as any previously verified ownership of ABC Corp stock, and either request confirmations of any additional information that may be required, such as at 135 or 160, or proceed directly to communications with the Host at stage 170. A Participant 20 who has not previously verified identity and established Registered Participant status must verify identity at stage 140. A Participant 20 who has established Registered Participant status, either previously or during this process, may request verifications of such additional name and address records, stage 135, as may be required for professional fund managers and others with different addresses for stock ownership records. After obtaining verifications of any desired name and address records for the Registered Participant account, Participant 20 may if required by the Host verify ownership at stage 160. Finally, at stage 165, Participant 20 provides instructions for what may be disclosed in the Moderator's report of verification, and at stage 170 the verified Participant 20 proceeds to communicating with the Host. Details of the system 100 will be provided below with reference to screen illustrations.

Participant 20 communication with the Host 30 may take place over any Host's website 200, as in the example shown in FIG. 2 employing the web site of ABC Corp. Communication may include any form of communication, ranging from online question-and-answer exchanges to either physical or virtual attendance of meetings, with typical corporate management applications to investor relations communications expected to include participation in shareholder meetings, analyst presentations, webinars, conference calls, corporate blogs, surveys and other types of company communications to determine and respond to investor interests. FIG. 2 provides an example of a typical corporate website page for investor relations, with a typical list of links for investor contacts, investor FAQ, information request, online investor kit, email alerts, and, for purposes of this illustration, the field 220 "new" link for submitting a question. Under the selected "submit question" field 220, the Participant 20 is provided three types of sub-communications presented as general 230, operating results 240, and shareholder meeting 250. As mentioned above, the verification services of the Moderator are only required when the Host 30 deems them necessary. For instance, "Shareholder Verification" to verify identity and ownership is not required for general communication 230 or communication concerning operating results 240, but the Host has chosen to require it for communication regarding shareholder meeting 250. Thus in order to interact with the Host 30 about the shareholder meeting 250, the Participant 20 must verify its shareholder status, see reference number 260, using the independent Moderator's services.

Participant verification may include verification of identity alone or of both identity and stock ownership records together, which combined identity and ownership verification is referred to in the example by the trademark term "Shareholder Verification." Again, the Host 30 decides whether identity verification alone is required or whether both identity and stock ownership verification is required. Depending on what is required by the Host 30, the Participant 20 can communicate as a verified identity (no need to confirm stock ownership) or as a verified shareholder (after confirming stock ownership). Identity verification confirms that the Participant is who the Participant purports to be by verifying the Participant's actual name and address, while ownership verification confirms that the Participant whose actual name and address has been verified is the owner or represents the owner of stock in the company that is the subject of communications.

The Participant 20 will be presented with a choice of multiple alternatives for both the identity and ownership verification processes. The use of multiple alternatives for an independent moderator's authentication of the Participant's actual name and address allows a Participant to choose a method that is convenient to verify identity without providing private information to the Host, making the process more readily acceptable to users than the current state of art. Similarly, the use of multiple alternatives for confirming stock ownership allows verification by Participant 20 with any form of ownership records, including all generally accepted forms available to either individual or institutional investors and whether the stock is issued directly by a company in registered form or owned beneficially in "Street name." This assures fair access to communications for all investors, rather than restricting access to only those investors who can use a limited choice of verification processes such as the current state of art process that can be used only by investors who can confirm stock ownership only if hold stock in an online brokerage or custodial account. Also unlike the current state of the art, the use of separate processes for identity and ownership verification allows the use of separate security provisions for each to protect private information, such as the example in the illustration of using segregated identity and ownership databases 70 and 80.

FIG. 3 shows a login webpage 300 for the shareholder verification required by the Host to permit Participant's communication. The login page 300 is shown as a pop-up window from the independent Moderator, the Shareholder Forum in this illustration, that is separate from the Host's website. In some embodiments, the login page 300 may be embedded within the Host's website. Participants who previously verified identity with the Moderator may login to their existing Registered Participant accounts using the Registered Participant field 310. Participants who have not previously verified identity will have to establish an account using the new registration field 320.

The method of the present invention will begin with a description of the process of logging in as a new registrant. Discussion of logging in as a Registered Participant will be reserved for later. To set up registration and become a Registered Participant, the Participant must provide an email address 322 and a proposed password 324 in the appropriate fields on the webpage 300. The Participant will then be provided with an identity verification webpage 400 that will be used to authenticate the actual name and address of the new registrant, as well as any additional addresses after the initial name and address has been verified to establish the Registered Participant account. See FIG. 4. The illustration of the present invention shows four ways to authenticate identity, through subscription information 410, professional membership information 420, educational contribution information 430 and finally through postal service notice by responding with a confirmation code that has been mailed to the Participant's stated name and address.

Figure 5:
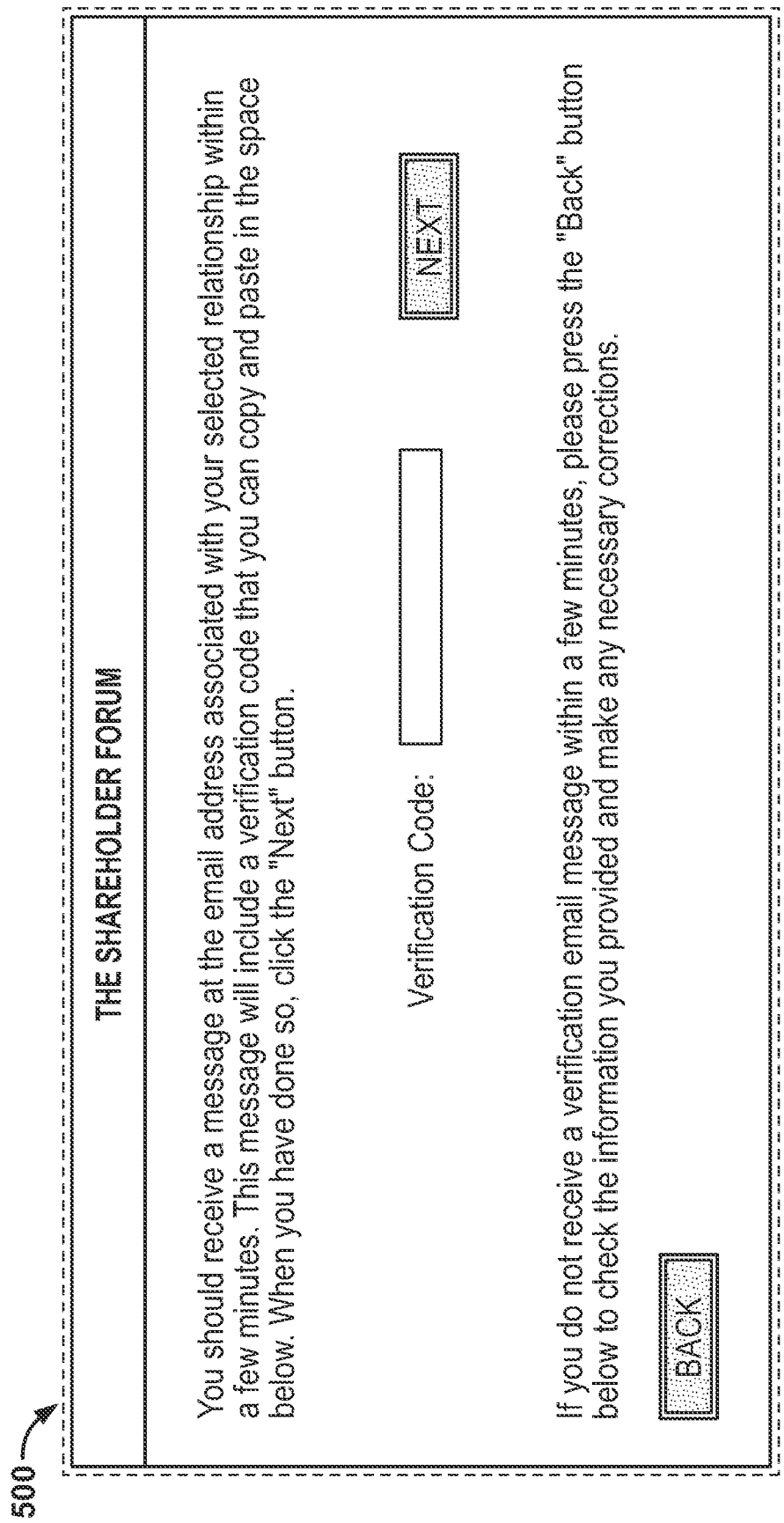
FIG. 5 is a fourth screen shot showing a graphical user interface of verification system embodiment of the subject invention.

Verification through subscription or membership, 410 and 420, respectively, uses information obtained at the Participant's request from records of organizations cooperating with the Moderator to support the interests of their subscribers or members, shown in this example as publishers 415 and professional organizations 425 ("Cooperating Organizations") which maintain records of their subscribers and members, respectively, in databases 90 and 91. The Moderator will establish a web service with each such Cooperating Organization, allowing a Participant with an online subscription or member account to enter his login credentials and authorize the Cooperating Organization's information exchange to provide the Moderator with the actual name, address and email address of the Participant. Verification by information obtained in course of making a contribution 430 allows the Participant to make a donation to one of a pre-selected group of educational organizations 435 so that online payment services can be used to report the actual name and address for the credit card owned by the Participant. Here, the Moderator uses one of the currently available online payment services to process the Participant's choice of contribution payment, and with the Participant's authorization obtains the name and address of the credit card that is confirmed in the process of making the contribution payment, in this illustration from database 92 that is maintained by the online payment processing company. Some of the subscriber, membership or credit card contribution processes for name and address authentication may also use commercially available systems to send a uniquely assigned code to the email address provided by the Participant to confirm that the Participant receives messages at that address, as shown in screen 500. See FIG. 5. The submission of a confirmation code may also be used for an alternate process in which the Moderator sends the code to the Participant's stated name and address by postal service notice (shown in FIG. 7).

Referring now to FIG. 6, once Participant identity is confirmed and the Participant has established a Registered Participant account, a number of options 610, 620, and 630 are made available for the Registered Participant to manage the account. As illustrated in illustration's presentation of the image of a link for "Your RP Account" in the top right corner of FIG. 6 and all other post-registration screen illustrations, the Registered Participant will have continuing access to account management features. As shown in field 610 and FIG. 7, the Registered Participant who has more than one name and address for ownership records, as is common for professional fund managers, may request authentication of additional names and addresses for listing in the account as required to confirm any stock ownership reported in those records. See FIG. 7. Screen 700 shows how a Registered Participant can verify additional accounts by any of the same processes available for a Participant's initial identity verification to establish a Registered Participant account, and additionally by having the Moderator send a uniquely assigned code by mail to a stated name and address so that the Registered Participant can confirm receipt at that address by entering the code on the Registered Participant's online account. Upon verification of any additional name and address, the Participant will be informed that the new record has been established and offered the choice of verifying another name and address or proceeding with an ownership verification process.

The Registered Participant also has an opportunity to establish identity as representative of an institutional investor that is required to file quarterly reports of its stock ownership with the U.S. Securities and Exchange Commission ("SEC"). See reference number 620. Since reliance on SEC reports will significantly simplify a professional investor's initial and future requests for verifications of stock ownership, a specific process has been developed to support authentications of a Registered Participant's name and address used in the records of SEC reports. See FIG. 8. Screen 800 shows a screen illustration of one variation of the process that permits Registered Participants to authenticate the name and address that appears in the SEC "EDGAR" database as the address of the institutional investor that files SEC Form 13F quarterly reports of stock ownership positions. This may be done, as shown in the example, by having the Registered Participant report the unique SEC-assigned "CIK" number for the investment fund he represents, which the Moderator will then report to one of the commercial financial data services to obtain records from SEC filings of the addresses used by that fund in its SEC reports. The Registered Participant will then use one of the available alternatives for identity verification to establish that the Participant can be reached at the reported address. Variations of the process for obtaining the SEC records of a fund's addresses include having the Registered Participant report the name of the fund, or one of more of the addresses, and having the Moderator confirm the address from records provided by a commercial provider of financial data services or from direct access to public SEC records. Once the Registered Participant's representation of fund has been established, the Moderator will be able to conduct fully automated verifications of the Registered Participant's ownership positions as reported in SEC records for that fund. The ownership records that are accessible from the SEC EDGAR database records, either from a variety of commercial services or by the Moderator's direct research, can be used repeatedly to support the Participant's communications, anonymously if desired, concerning any of the companies in which the represented fund owns stock.

If the Host invites or requires verification of stock ownership in addition to verification of identity, a Registered Participant who has used the process above to authenticate a name and address will be able to verify ownership of stock held under that name and address, reference number 630. FIG. 9A shows the stock ownership verification page as screen 900. The Registered Participant may confirm stock ownership by any of four processes, using more than one if and as required for multiple account holdings. Confirmation may be conducted (1) by referring to SEC records 910 using the Registered Participant's previously verified fund address and associated SEC filing code as described in the previous paragraph (see FIG. 8), (2) by referring to transfer agent records of the corporate issuer's stock register 920 if the Registered Participant is an owner of stock issued directly by the subject corporation, (3) by uploading an electronic copy of stock ownership records 930 to present documents that have been traditionally accepted in printed form for establishing stock ownership, or (4) by referring to online brokerage and custodial account records 940 using one of the commercially available services for online financial account management but with proprietary provisions established by the Moderator to protect the Registered Participant's privacy rights. When requiring stock ownership verification, the Host may select the period for which updates of investor ownership verification are required. For instance, the Host may require the Registered Participant to verify ownership annually, quarterly, or currently at the instance of communication.

Ownership verification through SEC filing records 910 is an automated verification process, requiring only the Registered Participant's selection of this alternative. Here the Moderator has used the verification of a Registered Participant's address as the same as that of fund required to report its stock holdings in quarterly Form 13F filings with the SEC, which the Moderator can access either directly or indirectly through commercial services s from SEC database 93 to determine the number of shares of a company's stock owned by the represented fund.

Ownership verification through transfer agent records 920 is also an automated verification process, requiring only the Registered Participant's selection of the alternative for one or more authenticated names and addresses. The availability of this process, however, is subject to the relevant company's authorization for the Moderator's access to the stock ownership records maintained by the company's transfer agent, according to information and database management standards established by the Moderator for members of the Securities Transfer Association. Here, a properly authorized transfer agent provides the Moderator a copy of only selected data elements from the records of share ownership to be stored in an independent database 94, which records are sufficient to match a name and associated address in the database 94 to the authenticated names and addresses in the Registered Participant's account, without the usual requirements of additional private information disclosures such as financial records or Social Security Numbers. This database 94 is updated periodically according to the subscribing company's frequency preference. The Moderator will maintain this database 94 independently, so that access to it is outside of the transfer agent's firewall and does not expose any of the transfer agent's records or facilities.

Ownership verification through uploaded stock ownership records 930 permits verification of share ownership status by providing electronic copies of documents that have traditionally been accepted in printed form with a supporting representation of the Registered Participant to establish stock ownership. See FIGS. 9A and 9B. The Registered Participant, whose actual name and address identity have been verified, uploads an electronic copy of any form of stock ownership record that has been generally accepted as proof of ownership, with a statement certifying that the document is a true record of a specified number of shares owned on the indicated date, and the copy of the document and supporting statement are stored by the Moderator in the ownership database 80.

Figure 9C:
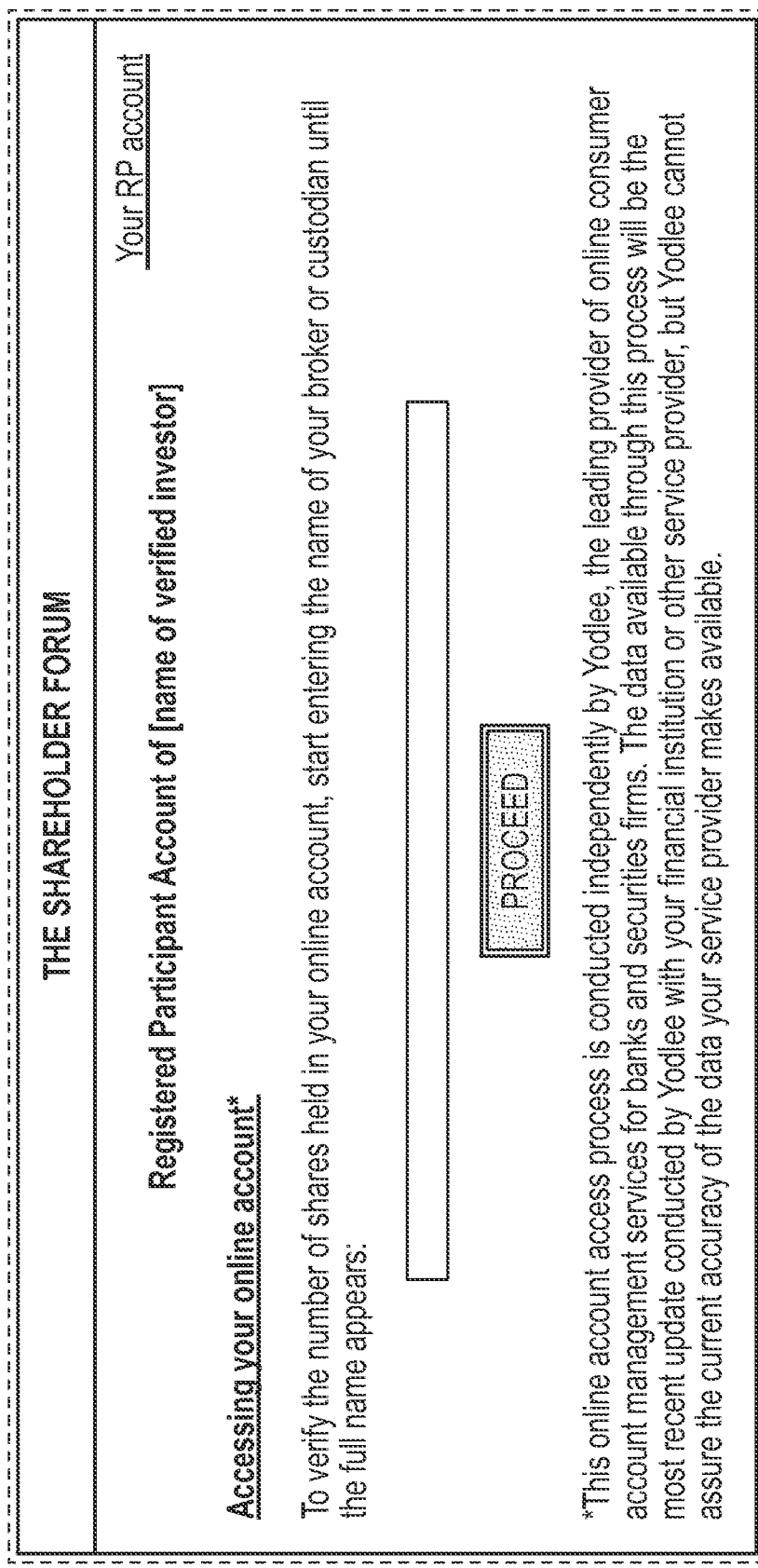
FIG. 9C is a tenth screen shot showing a graphical user interface of verification system embodiment of the subject invention.

Finally, a Participant can select ownership verification through online brokerage or custodial account records 940, see FIGS. 9A and 9C. This alternative, which has been available in the marketplace, can be used only by an investor who holds stock in an online brokerage or custodial account to which access is open to consumer financial account management services. The Registered Participant logs on to the brokerage or custodial account through the server of the consumer financial account management service, which service then automatically collects the broker or custodial records of the Participant from database 95 and reports the relevant stock ownership information to Moderator. The present invention is differentiated from the current marketplace service by privacy provisions and risk control measures when using the account records 940 method to verify ownership, including particularly provisions for the online account management service to delete all information collected from a Participant's account as soon as ownership verification is complete. The Moderator retains and stores on its ownership database 80 only the information authorized by the Registered Participant to verify stock ownership. In contrast, the prior art retains all of the Participant's private information, including login information, and uses the initial grant of access from the Participant to continue collecting information that may be found in that investor's account, with authorization to use the information for consumer marketing or other purposes. After ownership verification is complete, the Registered Participant is presented a screen to provide instructions on what to report to the Host 30 in order to proceed with the desired communication. See FIG. 10. By these instructions, the Registered Participant will have the option to decide whether to use an actual name or anonymous user name 1010 and what number of shares 1020 to report as owned before proceeding with the desired communication. For example, the Registered Participant may decide to use either an actual name or a "user name" that allows anonymous communication. Also, so as not to reveal one's identity, the Registered Participant can decide to report any number of shares owned, up to the number actually verified. The Registered Participant's instructions authorizing what name and ownership information are to be reported are stored on an instructions database (not shown) that is in communication with the server 10. The independent Moderator will then report only that authorized information to the Host, and will provide secure forwarding email to support the Registered Participant's desired communication. After the verification is reported, the Registered Participant is returned to the Host website to proceed with the intended communication. See Host's screen illustration 1100 in FIG. 11 which provides a field 1110 for proceeding with communication or engagement.

Returning now to FIG. 3 login webpage 300 is shown where the Participant, now a Registered Participant, may return to the login page and enter their email address 312 and password 314 to once again communicate with the Host 30. In some instances, the Host may require identity or ownership verification to be updated on a periodic basis such as annually monthly, etc., and the Registered Participant will be able to select any of the available alternatives for verifying whatever is required. See FIG. 9A. However, assuming that no identity or ownership update is required, and that the Registered Participant does not request any additional verifications or changes in disclosure instructions, the Moderator will automatically confirm the current status of previously established verifications and instructions stored in the identity database 70 and ownership database 80 to allow the Registered Participant to return directly to the Host's website for communication.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

The invention claimed is:

1. A computer implemented method comprising:
receiving, by at least one processor, from a user an electronic activity request to perform at least one activity with a non-anonymous online platform based on a user selection by the user at a user computing device;
wherein the electronic activity request comprises registration data comprising:
a user-supplied name, and
a user-supplied address;
wherein a permission to perform the at least one activity is based at least in part on private information of the user;
requesting, by the at least one processor, in response to the electronic activity request, identity verification data of the user from one or more cooperating organization databases of one or more cooperating organizations in response to the electronic activity request;
wherein the identity verification data is the private information of the user and comprises an organization-supplied name associated with the user and an organization-supplied address associated with the user;
wherein the non-anonymous online platform and the one or more cooperating organizations are unrelated;
printing, by the at least one processor, a unique code on a physical mail item;
receiving, by the at least one processor, the identity verification data via verification user input by the user at the user computing device;
wherein the identity verification data comprises the unique code provided by the physical mail item sent to the user-supplied address in response to the request for the identity verification data from the one or more cooperating organizations;
authenticating, by the at least one processor, the user based at least in part on a matching of the registration data with the identity verification data;
generating, by the at least one processor, a registered participant account associated with the user when the registration data matches the identity verification data,
wherein the registered participant account comprises participant ownership data associated with authenticated identity verification data,
wherein the participant ownership data comprises transfer agent records of a corporate issuer from at least one asset ownership authority database comprising a transfer agent associated with the corporate issuer;
instructing, by the at least one processor, based on the registered participant account, the non-anonymous online platform to permit the user to perform the at least one electronic activity with the non-anonymous online platform; and
automatically processing, by the at least one processor, based on the identity verification data, a transfer of user-specific data to the non-anonymous online platform to perform the at least one electronic activity, wherein the user-specific data comprises private information associated with the user and is required to perform the at least one electronic activity.

2. The method of claim 1, wherein the one or more cooperating organizations is at least one of a subscription organization, a membership organization, or a payment processing organization.

3. The method of claim 1, wherein the at least one activity is a communication of the user with another user of the non-anonymous online platform.

4. The method of claim 1, further comprising:
receiving, by the at least one processor, information disclosure instructions according to information disclosure selections by the user; and
wherein the information disclosure instructions are associated with an amount of the identity verification data that the one or more cooperating organization databases are authorized to provide.

5. The method of claim 1, wherein the identity verification data comprises participant ownership data, identifying information about an ownership of at least one asset by the user; and
updating, by the at least one processor, the registered participant account with the authenticated participant ownership data.

6. The method of claim 5, wherein the participant ownership data comprises securities and exchange commission (SEC) filing records from the at least one asset ownership authority database comprising a SEC database.

7. The method of claim 5, wherein the participant ownership data comprises corporate issuer's transfer agent records from the at least one asset ownership authority database comprising a corporate issuer's transfer agent.

8. The method of claim 5, wherein the at least one asset is a stock of an issuer; and
wherein the at least one activity is a communication of the user with the issuer on the non-anonymous online platform.

9. A system comprising:
at least one processor configured to implement software instructions causing the at least one processor to perform steps to:
receive, from a user, via user input by the user at a user computing device, an electronic activity request to perform at least one activity with a non-anonymous online platform;
wherein the electronic activity request comprises registration data comprising a user-supplied name and a user-supplied address;
wherein a permission to perform the at least one activity is based at least in part on private information of the user;
request, in response to the electronic activity request, identity verification data from one or more cooperating organization databases of one or more cooperating organizations;
wherein the identity verification data is the private information of the user and comprises an organization-supplied name associated with the user and an organization-supplied address associated with the user;
wherein the online platform and the one or more cooperating organizations are unrelated;
print, by the at least one processor, a unique code on a physical mail item;
receive, by the at least one processor, the identity verification data via verification user input by the user at the user computing device;
wherein the identity verification data comprises the unique code provided by the physical mail item sent to the user-supplied address in response to the request for the identity verification data from the one or more cooperating organizations;

authenticate the user-based at least in part on a matching of the registration data with the identity verification data;

generate a registered participant account associated with the user when the registration data matches the identity verification data, wherein the registered participant account comprises participant ownership data associated with authenticated identity verification data, wherein the participant ownership data comprises transfer agent records of a corporate issuer from at least one asset ownership authority database comprising a transfer agent associated with the corporate issuer;

instruct, based on the registered participant account, the online platform to permit the user to perform the at least one electronic activity with the online platform; and automatically process, by the at least one processor, based on the identity verification data, a transfer of user-specific data to the non-anonymous online platform to perform the at least one electronic activity, wherein the user-specific data comprises private information associated with the user and is required to perform the at least one electronic activity.

10. The system of claim 9, wherein the one or more cooperating organizations is at least one of a subscription organization, a membership organization, or a payment processing organization.

11. The system of claim 9, wherein the at least one activity is a communication of the user with another user of the non-anonymous online platform.

12. The system of claim 9, wherein the at least one processor is further configured to implement the software instructions causing the at least one processor:
receive-information disclosure instructions according to information disclosure selections by the user; and
wherein the information disclosure instructions are associated with an amount of the identity verification data that the one or more cooperating organization databases are authorized to provide.

13. The system of claim 9, wherein the identity verification data comprises participant ownership data, identifying information about an ownership of at least one asset by the user; and
wherein the at least one processor is further configured to implement the software instructions causing the at least one processor to update the registered participant account with the authenticated participant ownership data.

14. The system of claim 13, wherein the participant ownership data comprises securities and exchange commission (SEC) filing records from the at least one asset ownership authority database comprising a SEC database.

15. The system of claim 13, wherein the at least one asset is a stock of an issuer; and
wherein the at least one activity is a communication of the user with the issuer on the online platform.

* * * * *